United States Patent [11] 3,571,737

| | |
|---|---|
| [72] Inventor | Stewart E. Miller<br>Middletown Township, Monmouth County, N.J. |
| [21] Appl. No. | 735,445 |
| [22] Filed | June 7, 1968 |
| [45] Patented | Mar. 23, 1971 |
| [73] Assignee | Bell Telephone Laboratories, Incorporated<br>Murray Hill, N.J. |

[54] TRANSMISSION LINE
9 Claims, 6 Drawing Figs.

[52] U.S. Cl. .................................................. 330/4.3,
250/199, 350/96
[51] Int. Cl. ...................................................... H01s 3/05,
H01s 3/09
[50] Field of Search .......................................... 330/4.3;
331/94.5; 350/96, 96 (WG); 250/199

[56] References Cited
UNITED STATES PATENTS

| | | | |
|---|---|---|---|
| 3,341,787 | 9/1967 | Baird et al. .................. | 331/94.5 |
| 3,408,131 | 10/1968 | Kapany ...................... | 330/4.3X |

*Primary Examiner*—Richard A. Farley
*Assistant Examiner*—Daniel C. Kaufman
*Attorneys*—R. J. Guenther and Arthur J. Torsiglieri

ABSTRACT: Losses inherent in a dielectric optical transmission line are overcome by including regions of active laser material along the line which, when suitably excited, function as laser amplifiers for the guided wave energy. A variety of pumping arrangements are described including injection diodes and electroluminescent materials.

INVENTOR
S. E. MILLER
BY
*Sylvan Sherman*
ATTORNEY

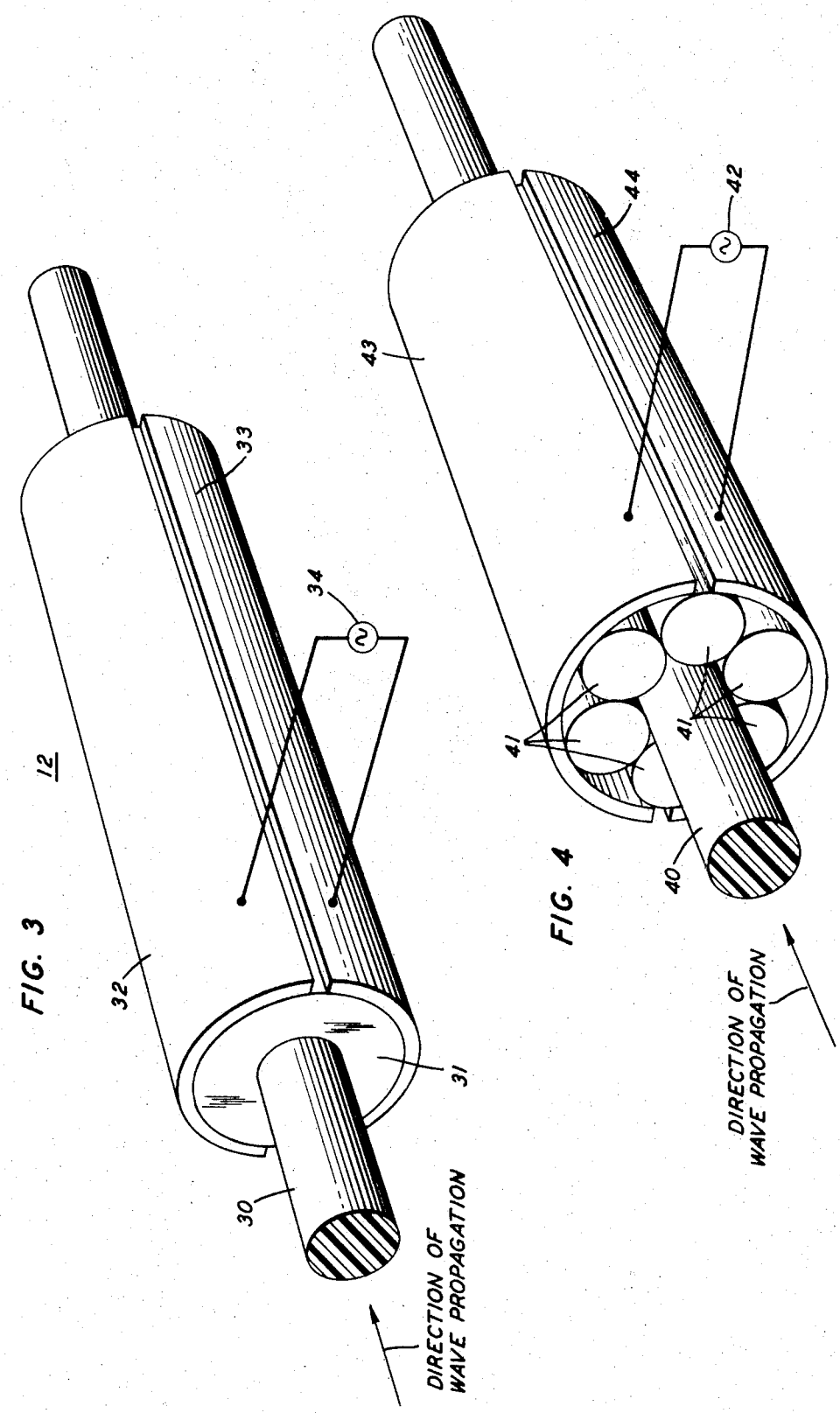

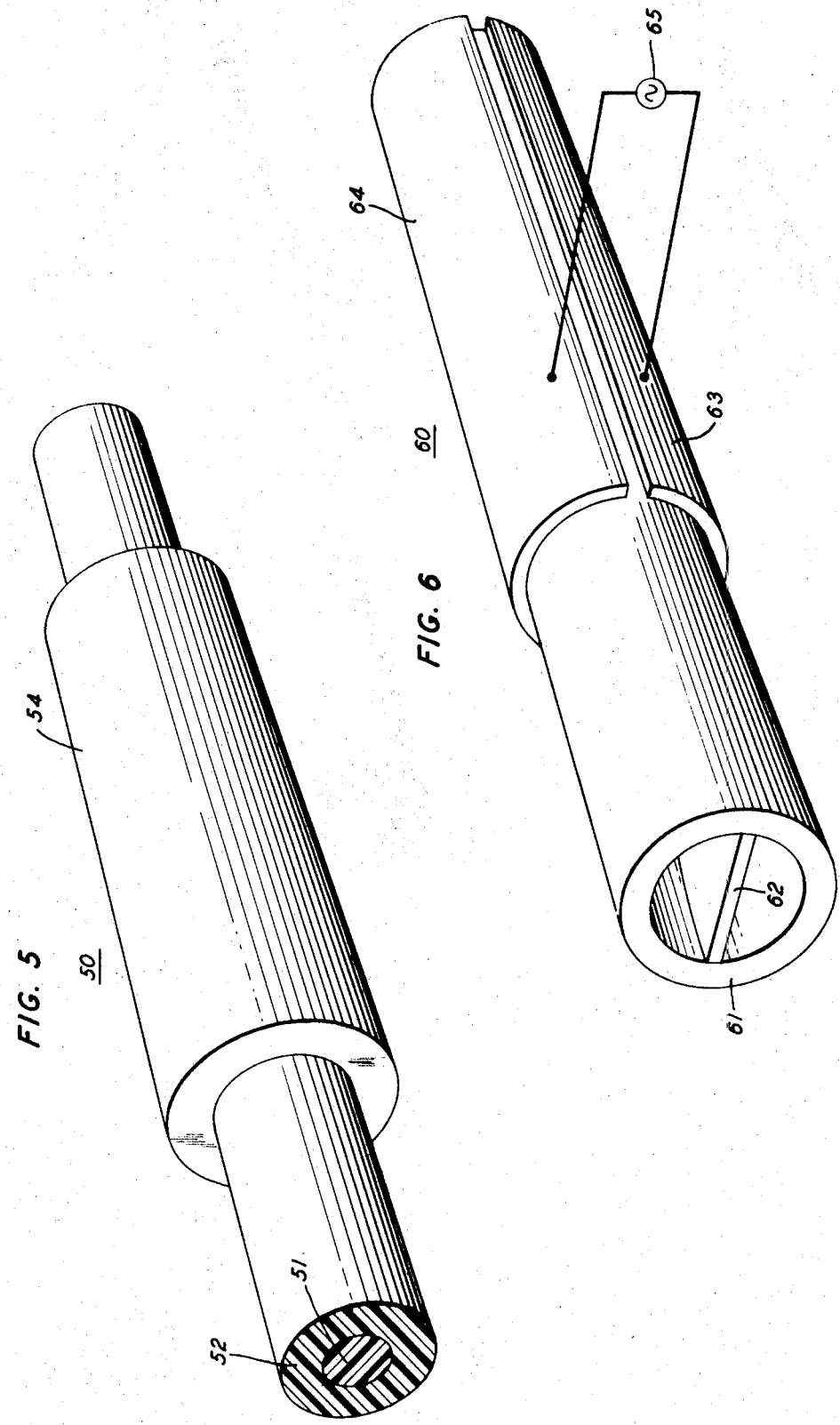

TRANSMISSION LINE

This invention relates to active transmission lines for the efficient propagation of electromagnetic wave energy.

BACKGROUND OF THE INVENTION

The advent of the laser as a source of highly coherent and monochromatic electromagnetic wave energy in the infrared, visible and ultraviolet portions of the frequency spectrum, hereafter to be referred to collectively as optical waves, makes possible the use of such waves as a carrier signal in a communication system. However, utilization of such waves in this manner is dependent upon the availability of an efficient transmission medium.

In my copending application Ser. No. 347,211, filed Feb. 25, 1964, now abandoned in favor of my continuation-in-part application Ser. No. 429,843, filed Feb. 2, 1965, now U.S. Pat. No. 3,434,774 and, more recently, in the copending application by E. A. J. Marcatili Ser. No. 730,192, filed May 17, 1968, there are described solid state waveguides using two or more dielectric materials of different refractive indices. While waveguides of the type described in the above-identified applications have many advantages, they are, unfortunately, characterized by transmission losses of from 0.1 to as much as 2.0 db./meter Such relatively high losses, if not compensated for in some reasonably economical manner, would limit the use of such transmission lines to relatively short runs such as might be encountered at transmitter, receiver, and repeater stations.

SUMMARY OF THE INVENTION

In accordance with the present invention, laser techniques are employed to reduce the net attenuation of dielectric waveguides. In particular, the principal guiding dielectric element is suitably doped with an active laser material capable of stimulated emission at the operating frequency. Amplification of the signal due to lasing action is achieved by pumping longitudinally spaced portions of the transmission line by any one of a variety of means including injection diodes and electroluminescent materials. By properly selecting the spacing between pumped regions and the lengths of the pumped regions, the total gain produced over an extended interval of transmission line can be made substantially equal to the transmission loss in the passive portion of the line over the same interval. For example, in accordance with the invention, net losses in a 100 meter length of dielectric transmission line having an attenuation of the order of 0.1 db./meter can be reduced to a small finite value by means of 20 lasing regions each producing a net gain of 10 db. per region. Advantageously, the line is designed to have some small, but finite attenuation.

It is a feature of the invention that the total transmission line, including pumping sources, can be constructed as a complete, unitary entity using solid-state techniques and devices.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 3 shows a second embodiment of an active transmission line using electroluminescent material as a pumping source;

FIG. 4 shows an alternative arrangement of the embodiment of FIG. 3;

FIG. 5 shows an embodiment of the invention in which the transverse distribution of laser material is limited; and FIG. 6 shows another type of transmission line in which the invention can be practiced.

DETAILED DESCRIPTION

Figure 1:
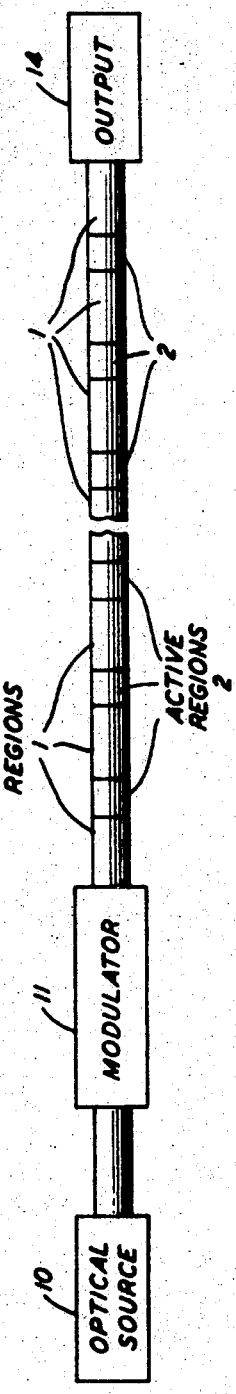
FIG. 1 shows a transmission system including an active transmission line.

Referring to the drawings, FIG. 1 shows a typical optical communication system including, at the input end of the system, a source 10 of optical wave energy and optionally, a modulator 11 coupled into the input end of an active transmission line 12 of the type to be described in greater detail hereinbelow.

At the output end of transmission line 12, the wave energy from line 12 is directed into some form of output apparatus 14.

Transmission line 12 is characterized as an "active" transmission line to distinguish it from the usual transmission line which, by contrast, is passive, and to distinguish it from otherwise passive transmission lines along which repeater amplifiers are interposed. In an active transmission line, in accordance with the present invention, it is the line itself which is made to have gain rather than a distinctly separate amplifier disposed between sections of line. Thus, in FIG. 1 the transmission line is shown to include passive regions 1 and active regions 2, but in each case it is the line itself which is being characterized. This is more clearly illustrated in FIG. 2, which is a more detailed view of a portion of line 12.

Figure 2:
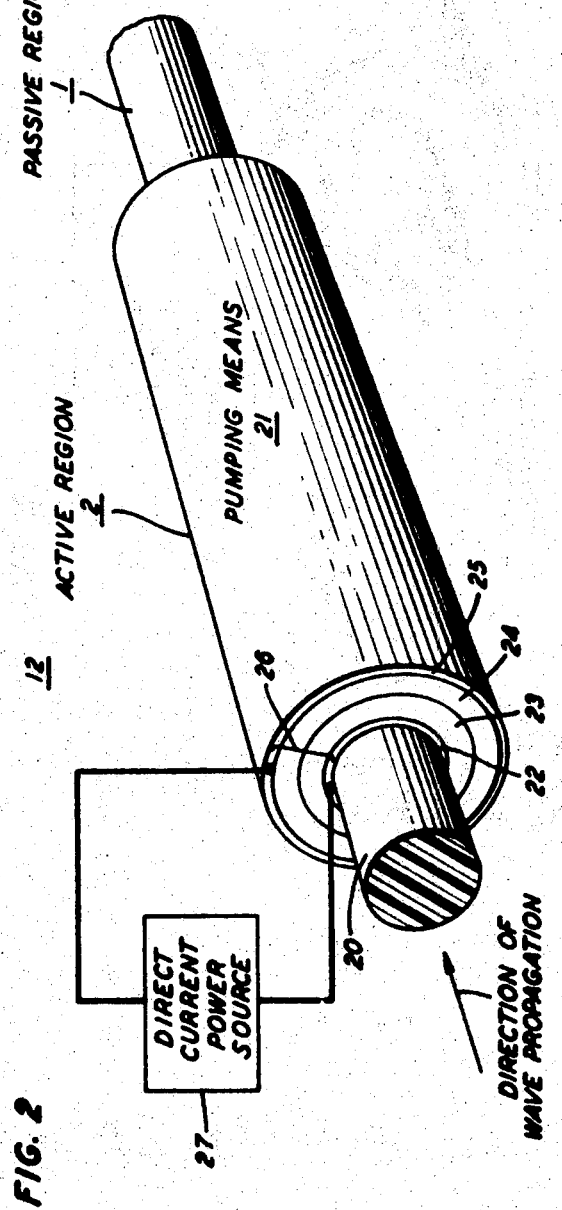
FIG. 2 shows a first embodiment of an active transmission line using injection diode pumping.

FIG. 2 shows one embodiment of the invention comprising a dielectric waveguide 20, of the type described in my above-identified application, modified in the manner to be explained. As described in my copending application, waveguide 20 is made of low-loss dielectric material whose dielectric constant, and, hence, whose refractive index is a maximum at the center and tapers to a minimum at the outer edge of the guide. This tapering can be continuous, or can be achieved in one or more discrete steps. In accordance with the present invention, all, or a portion of the material of waveguide 20 serves, in addition, as the host material for laser ions. The latter are selected to produce gain through stimulated emission at the particular frequency of interest when pumped, but to exhibit very little loss when not pumped. The latter condition is satisfied by four-level laser materials in which the lower level is characteristically unpopulated. Typical of such materials are the rare earths neodymium, holmium and thulium. Various examples of suitable laser materials, host materials and their lasing wavelengths are given in an article by E. Switzer entitled "Glass Lasers," published in the Oct. 1966 issue of the Proceedings of The Institute of Electrical and Electronic Engineers, pages 1249 through 1261. Typically, the optical source and the waveguide would be made of the same laser material.

Waveguide 20, including laser ions, remains passive in the absence of suitable pumping energy. Gain is provided by locating pumping means 21 at longitudinally spaced intervals along the waveguide. In the illustrative embodiment of FIG. 2, pumping energy is derived from an injection diode 26 that is concentric with and completely surrounds a region of waveguide 20. Specifically, the injection diode comprises a thin transparent inner electrode 22 in ohmic contact with one side 23 of diode 26. A reflecting outer electrode 25 is in ohmic contact with the other side 24 of diode 26. The two sides 23 and 24, in turn, form a PN junction therebetween. A direct current power source 27 forward biases diode 26 an amount sufficient to induce emission. The latter emission is transmitted through electrode 22 and pumps that region of waveguide 20 that extends coextensively with pumping means 21 to form a laser amplifier that is an integral part of transmission line 12. As an example, neodymium-doped glass fiber can be pumped by the $0.9\mu$ incoherent radiation emitted by a gallium-arsenide PN junction. The resulting lasing action will amplify signal energy at about $283 \times 10^{12}$ Hz., or $1.06\mu$. For other specific materials and operating frequencies, see the above-identfied article by E. Switzer.

FIG. 3 shows an alternate pumping arrangement using the emissions from an electroluminescent material as the pumping energy. In this embodiment, the dielectric waveguide 30, suitably doped with laser ions, is surrounded by an electroluminescent material 31. The latter is selected with reference to the pump requirements of the waveguide. For a listing of electroluminescent materials and emission frequencies, see "Electroluminescence and Semiconductor Lasers," by H. F. Ivey, published in the Nov. 1966 issue of the Institute of Electrical and Electronic Engineers' Journal of Quantum Electronics, pages 713—725. For a more detailed discussion of electroluminescent effects see "Electroluminescence and Related Effects," by H. F. Ivey, published by the Academic Press, 1963, and "Electroluminescence," by H. K. Henisch, The MacMillan Company, 1962.

As one example, for a neodymium-doped glass waveguide, the electroluminescent material can be a solid solution of zinc and cadmium selenide, with a copper dopant. Obviously, other active materials can replace the neodymium with appropriate changes in pumping wavelength.

Excitation is applied to the electroluminescent material by means of a pair of metallic electrodes 32 and 33 connected to an alternating current source 34. The frequency of source 34 is typically in the audio frequency range between 100 and 10,000 hertz.

Another electroluminescent material suitable for pumping neodymium is zinc-mercury sulfide with traces of copper and chlorine, (Zn-Hg)S: Cu (0.2 percent): Cl (0.075 percent). However, this material cannot be put in glass but can be suspended in castor oil. A suitable structure for such a line is shown in FIG. 4.

In FIG. 4 the transmission line 40 is surrounded by a plurality of hollow tubes 41, each of which is filled with an oil suspension of electroluminescent material. The tubes can extend over the entire length of the transmission line or can, alternatively be located at longitudinally spaced intervals along the line. Excitation is provided by an alternating current power source 42 connected to a pair of semicylindrical electrodes 43 and 44 which encompass the tubes.

In the above discussion, transmission line 12 is depicted as comprising a single wavepath. It should be understood, however, that the cross-sectional dimensions of a typical optical wavepath are only of the order of a few mils. Accordingly, a practical transmission line would, advantageously, include a plurality of individual dielectric waveguides arranged in a bundle.

It was indicated hereinabove, that the laser ions were distributed throughout the length of the transmission line. This tends to provide a degree of flexibility in that a pumping source can be located anywhere along the line and lasing achieved. However, it will be recognized that the line can be fabricated such that the lasing ions are only included at prescribed locations along the lines. That is, the longitudinal distribution of the laser ions can be limited to only those regions of the transmission line that are to be pumped. This expedient would be necessary in those instances where the unpumped laser material is highly absorptive at the signal frequency.

It should also be noted that the transverse distribution of the laser ions can also be limited. In a dielectric waveguide of the type described hereinabove, the refractive index tapers from a maximum at the center to a minimum at the outer edge. Correspondingly, the distribution of electromagnetic energy tends to be greatest in the inner portion of the waveguide and much less at the outer edges of the guide. Accordingly, it is only in the inner portion of the waveguide that the laser material need be placed. Thus, for example, in a waveguide 50 shown in FIG. 5, comprising two concentric dielectric cylinders 51 and 52 and pumping means 54, it is generally sufficient if only the innermost, or core cylinder 51 contains active laser material. Similarly, if a waveguide comprises more than two concentric cylinders, or the refractive index tapering is continuous, only the inner cylinders or the inner portion of the continuously tapered waveguide need contain the laser material.

In the embodiments of FIGS. 3 and 4, the electroluminescent material was shown as a discrete element. It is apparent, however, that the electroluminescent material can, alternatively be embedded within the dielectric material of the waveguide. Thus, in FIG. 5, the core cylinder 51 can include the laser material and the outer cylinder 52 can include the electroluminescent material. Alternatively, both the laser material and the electroluminescent material can be distributed throughout the two cylinders. The precise arrangement used in any particular application would be a function of many factors including the manufacturing process employed to fabricate the transmission line, and cost.

The principles of the present invention are readily applicable to other types of waveguiding structures, as illustrated by FIG. 6. In this embodiment the desired refractive index distribution is effectively obtained by altering the symmetry of the wavepath. Accordingly, in FIG. 6, transmission line 60 comprises a hollow, circular cylinder 61 within which a thin sheet 62 of dielectric material is located. The sheet, which is transparent at the operating frequency, extends diametrically across cylinder 61, and is twisted about the cylinder axis as it extends in the longitudinal direction. The sheet, in addition, hosts a suitable laser material to produce amplification in accordance with the present invention. In the embodiment of FIG. 6, cylinder 61 includes electroluminescent material which is activated at longitudinally spaced regions by means of electrodes 63 and 64, and alternating power source 65. Alternatively, other means of pumping, such as injection diodes arranged as illustrated in FIG. 2, can be used. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. An active transmission line for the guidance of electromagnetic wave energy comprising:
    an elongated transparent dielectric material having an effective refractive index which decreases from a maximum at the center to a minimum at the outer edge of said line; characterized in that said material includes therein active laser material suitable for pumping and subsequent stimulated emission at the frequency of said electromagnetic wave energy; and
    means, including an electroluminescent material distributed along said line for pumping longitudinally spaced regions of said dielectric material.

2. The transmission line according to claim 1 wherein said laser material is longitudinally distributed along all of said line.

3. The transmission line according to claim 1 wherein said laser material is longitudinally distributed along selected regions of said line.

4. The transmission line according to claim 1 wherein said electroluminescent material is separate from said line.

5. The transmission line according to claim 1 wherein said electroluminescent material is contained within the dielectric material of said transmission line.

6. An active transmission line for the guidance of electromagnetic wave energy comprising:
    an elongated transparent dielectric material having an effective refractive index which decreases from a maximum at the center to a minimum at the outer edge of said line;
    an active laser material, suitable for pumping and subsequent stimulated emission at the frequency of said electromagnetic wave energy, transversely distributed only within the inner portion of the cross-sectional area of said line; and
    means distributed along said line for pumping longitudinally spaced regions of said dielectric material.

7. The transmission line according to claim 6 wherein each of said pumping means comprises an injection diode.

8. The transmission line according to claim 7 wherein each of said diodes completely surrounds a region of said line.

9. An active transmission line for the guidance of electromagnetic wave energy comprising:

an elongated transparent dielectric material having an effective refractive index which decreases from a maximum at the center to a minimum at the outer edge of said line;

an active laser material, suitable for pumping and subsequent stimulated emission at the frequency of said electromagnetic material, transversely distributed throughout the cross-sectional area of said line; and means distributed along said line for pumping longitudinally spaced regions of said dielectric material.

Notice of Adverse Decision in Interference

In Interference No. 97,801 involving Patent No. 3,571,737, S. E. Miller, TRANSMISSION LINE, final judgment adverse to the patentee was rendered Aug. 18, 1972, as to claims 1, 2, 3, 4, 6 and 9.

[*Official Gazette October 31, 1972.*]